United States Patent
Gallardo Pinto et al.

(10) Patent No.: US 12,455,099 B2
(45) Date of Patent: Oct. 28, 2025

(54) PARABOLIC CONCENTRATING SOLAR COLLECTOR

(71) Applicant: OFF TECHNOLOGIES STP, S.L., Madrid (ES)

(72) Inventors: Francisco José Gallardo Pinto, Madrid (ES); Bernardino Jimenez Sanchez, Madrid (ES); Angel Gabriel Ramos Ramos, Madrid (ES)

(73) Assignee: OFF TECHNOLOGIES STP, S.L., Madrid (ES)

( * ) Notice: Subject to any disclaimer, the term of this patent is extended or adjusted under 35 U.S.C. 154(b) by 646 days.

(21) Appl. No.: 17/801,693

(22) PCT Filed: Feb. 24, 2021

(86) PCT No.: PCT/ES2021/070131
§ 371 (c)(1),
(2) Date: Mar. 20, 2023

(87) PCT Pub. No.: WO2021/170892
PCT Pub. Date: Sep. 2, 2021

(65) Prior Publication Data
US 2023/0272945 A1    Aug. 31, 2023

(30) Foreign Application Priority Data
Feb. 25, 2020   (ES) ................. ES202000023

(51) Int. Cl.
*F24S 23/74*      (2018.01)
*F24S 10/40*      (2018.01)
(Continued)

(52) U.S. Cl.
CPC ............... *F24S 23/74* (2018.05); *F24S 10/45* (2018.05); *F24S 30/425* (2018.05); *F24S 40/20* (2018.05);
(Continued)

(58) Field of Classification Search
CPC ........ F24S 23/74; F24S 10/45; F24S 2080/05; F24S 50/60
See application file for complete search history.

(56) References Cited

U.S. PATENT DOCUMENTS 2,205,378 A * 6/1940 Greeley .................. F24S 20/20
126/694
4,243,019 A    1/1981 Severson
(Continued)

FOREIGN PATENT DOCUMENTS

| CH | 710014 A2 * | 2/2016 | ............... F24S 10/45 |
| CN | 201935422 U * | 8/2011 | ................. F24J 2/14 |

(Continued)

*Primary Examiner* — Jorge A Pereiro
(74) *Attorney, Agent, or Firm* — Hayes Soloway P.C.

(57) ABSTRACT

The element on which solar radiation is concentrated, specifically, a vacuum tube, remain static at all times with respect to the movements that a parabolic reflective surface may make according to the direction of solar radiation, such that inlet and outlet pipes of the vacuum tube do not need to be articulated, which facilitates the installation and insulation thereof and reduces production costs. The parabolic reflective surface can pivot 360° with respect to the vacuum tube without interfering with the pipes, allowing an active safety system for protecting against strong winds and preventing overheating to be produced, in addition to allowing the surfaces to be cleaned by means of nozzles spray pressurized water. The collector also includes passive safety means against strong winds.

9 Claims, 3 Drawing Sheets

(51) Int. Cl.
*F24S 30/00* (2018.01)
*F24S 30/425* (2018.01)
*F24S 40/20* (2018.01)
*F24S 40/80* (2018.01)
*F24S 80/00* (2018.01)

(52) U.S. Cl.
CPC ......... *F24S 40/85* (2018.05); *F24S 2030/132* (2018.05); *F24S 2080/05* (2018.05)

(56) References Cited

U.S. PATENT DOCUMENTS

| | | | | |
|---|---|---|---|---|
| 4,452,233 | A * | 6/1984 | Goodman, Jr. | F24S 80/30 |
| | | | | 165/184 |
| 4,505,263 | A * | 3/1985 | Nameda | F24S 40/80 |
| | | | | 138/140 |
| 4,515,148 | A | 5/1985 | Boy-Marcotte | |
| 10,447,200 | B1 * | 10/2019 | Fakih | H02S 40/34 |
| 11,677,350 | B2 * | 6/2023 | Barclay | H02S 20/32 |
| | | | | 136/246 |
| 2004/0163640 | A1 * | 8/2004 | Kuckelkorn | F24S 20/20 |
| | | | | 126/694 |
| 2008/0163864 | A1 * | 7/2008 | Larson | F24S 23/74 |
| | | | | 126/694 |
| 2009/0120016 | A1 * | 5/2009 | Hon | H02S 20/00 |
| | | | | 52/173.3 |
| 2010/0058703 | A1 * | 3/2010 | Werner | H02S 20/00 |
| | | | | 52/645 |
| 2010/0212654 | A1 * | 8/2010 | Alejo Trevijano | H02S 40/22 |
| | | | | 29/726 |
| 2013/0056000 | A1 * | 3/2013 | Perrin | F24S 30/425 |
| | | | | 126/714 |
| 2013/0255167 | A1 * | 10/2013 | Concho | F24S 40/85 |
| | | | | 52/173.3 |

FOREIGN PATENT DOCUMENTS

| | | | |
|---|---|---|---|
| DE | 102016218372 A1 * | 11/2017 | |
| GB | 2235786 A | 3/1991 | |
| JP | 2012112604 A * | 6/2012 | ............. F24S 23/70 |
| WO | WO-2010008584 A2 * | 1/2010 | ................ F24J 2/14 |
| WO | 2012070436 A1 | 5/2012 | |

* cited by examiner

PARABOLIC CONCENTRATING SOLAR COLLECTOR

CROSS-REFERENCE TO RELATED APPLICATIONS AND PRIORITY

This patent application claims priority from PCT Application No. PCT/ES2021/070131 filed Feb. 24, 2021. This patent application is herein incorporated by reference in its entirety.

OBJECT OF THE INVENTION

The present invention relates to a parabolic concentrating solar collector, which has a new structure from which many advantages are derived.

The object of the invention is to provide a self-orienting collector with a simple structure that makes it more economical, with reduced dimensions that allow it, with a single product based on the multiplication of the same, to adapt to very different required features, and that is easy to adjust, with high performance, having both active and passive safety means, as well as self-cleaning means.

BACKGROUND OF THE INVENTION

In the field of practical application of the invention, parabolic concentrating solar collectors are known, wherein a parabolic structure that concentrates solar radiation on a collector operates to heat a fluid passing through it, normally water, without ruling out other fluids.

To optimise the performance of devices of this type, it is essential that they include self-orienting means, by virtue of the changing orientation of solar radiation throughout the day.

In this sense, devices of this type pivot with respect to an axis of rotation located behind the parabolic surface, thus affecting the entire structure.

This means that the inlet and outlet pipes of the fluid in the collector itself are subjected to torques, wherein the participation of rotating connections that are complex, expensive and difficult to thermally insulate is essential.

Another problem with devices of this type is that due to their very configuration, they generate a "candle" effect, which could damage them.

In this sense, the degree of mobility of these devices is relatively limited, meaning that complete protection against strong winds cannot be ensured depending on their direction.

Furthermore, devices of this type lose efficiency over time due to the dirt that may be deposited on their reflective concentrating surface, since they are sometimes arranged in places that are difficult to access for their manual cleaning.

DESCRIPTION OF THE INVENTION

The proposed parabolic concentrating solar collector fully resolves the aforementioned problems, in each and every one of the aforementioned aspects.

For this, according to one of the essential features of the invention, it has been envisaged that the element on which solar radiation is concentrated, a vacuum tube in the present case, is arranged on a static frame that is linked to it at both ends, in other words, said vacuum tube is not affected by the rotational movements of the reflective and pivoting parabolic surface at any time.

More specifically, and contrary to what occurs in conventional collectors of this type, it has been envisaged that the parabolic reflective surface pivots with respect to the imaginary central longitudinal axis of the vacuum tube.

To do this, said parabolic reflective surface will be linked by its curved lateral edges to a series of radial arms that converge in a bearing or bushing whose axis, as mentioned, is axial to the imaginary central longitudinal axis of the vacuum tube.

Based on this structuring, at least one small electric motor with a pinion that will engage with a toothed wheel integral with the bearing structure of the parabolic reflective surface will be arranged on the support frame of said vacuum tube, at the ends of which the corresponding pivoting axes of the parabolic reflective surface are established.

This structure has multiple advantages, including the following:

Since the vacuum tube has an invariable static position, the inlet and outlet tubes of the fluid to be heated do not require complex articulated connections and can be easily thermally insulated, which simplifies and makes assembly cheaper.

The means by which it is possible to pivot the parabolic reflective surface are not limited in rotation, contrary to what occurs in conventional collectors. This allows them to be turned completely, both as active safety means against strong winds or against excessive temperature inside the vacuum tube and to perform the automatic cleaning of the collector, as will be seen later.

According to another feature of the invention, it has been envisaged that the vacuum tube has a novel structure, so that the chamber through which the heat transfer fluid to be heated circulates is subdivided into two concentric cylindrical chambers, an internal chamber, through which the cold fluid is intended to flow, and an external chamber, concentric to it, which communicates with the previous chamber through a hole at its lower end, so as to maximise the contact surface with the area of radiation of the vacuum tube, which corresponds to the external surface of the external chamber, optimising the performance of said tube.

To further optimise said heat transmission process, it has been envisaged that the heat transfer fluid in its movement through the space defined between the two chambers is made to circulate through a helical deflector, established between both chambers that forces said heat transfer fluid to flow in a helical direction, so that a much more homogeneous and optimal heat transmission is achieved.

In this sense, the access section to the inner chamber must be the same as the outlet section of the heat transfer fluid from the outer chamber, so that pressure differences are not created.

The collector will be able to auto-orient itself using any known auto-orientation system, be it in real time, based on the calculation of the angle of incidence of the sun, wherein it will be assisted by one or more photovoltaic panels that ensure its complete autonomy, and said movement can be simply programmed by means of a clock.

In this sense, and as can be seen, the orientation of the collector has not been discussed throughout this description, since it could be both horizontal (following the azimuth) or vertical (east-west), without affecting the essence of the invention.

According to another feature of the invention, it has been envisaged that the parabolic reflective surface includes a series of sectors in its central area which, also being reflective in nature, act as folding gates against the tension of a spring, on a pivoting axis, thus determining passive safety means against strong gusts of wind, which allow said sectors to fold and air to pass through them, reducing the resulting stresses on the collector assembly.

Another novel feature of the invention is that, in the event that the collector adopts a horizontal layout, a series of nozzles that spray pressurised water are established under its support structure or frame, nozzles which enable the parabolic refractive surface to be washed and subsequently cleaned when it is turned completely, being oriented downwards, in opposition to said nozzles.

This cleaning process, as well as the self-orientation of the collector based on the position of the sun, can be automated in a simple way, taking advantage of the inclusion of the photovoltaic panel or panels previously described.

Another improvement of the invention is that, optionally, one of the end support frames of the device has a scissor-type structure, adjustable by means of a worm screw associated with an electric motor associated with the control electronics of the device, such that it allows the inclination of the concentrator to be adjusted according to the azimuth axis. Thus, a two-axis adjustable parabolic solar concentrator is achieved.

Finally, it must be said that, given that the parabolic reflective surface only concentrates the solar radiation on an arc of the circular surface of the vacuum tube, it has been envisaged that a Fresnel-type concentrator lens is arranged on the area that is not affected by said concentrator, lens which will obviously be integral with the pivoting structure associated with the parabolic reflective surface.

As mentioned previously, the device of the invention is intended to be manufactured preferably in small and manageable sizes, so that they are implanted in a multiple number of devices, which in addition to giving greater adaptability to the requirements of each case, allow the temperature of the complete installation to be better controlled by being able to selectively disable some and other devices to adapt to the changing requirements that said installation may have.

The device thus described offers high performance, of the order of 95%, compared to other known systems.

Likewise, the modular nature of the device of the invention is worth noting, since it is a scalable device that can be grouped with others of the same type, not requiring large lengths as is the case with existing parabolic solar concentrators, which represents great versatility of assembly.

DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof in which, by way of illustration and not limitation, the following is represented.

PREFERRED EMBODIMENT OF THE INVENTION

Figure 1:
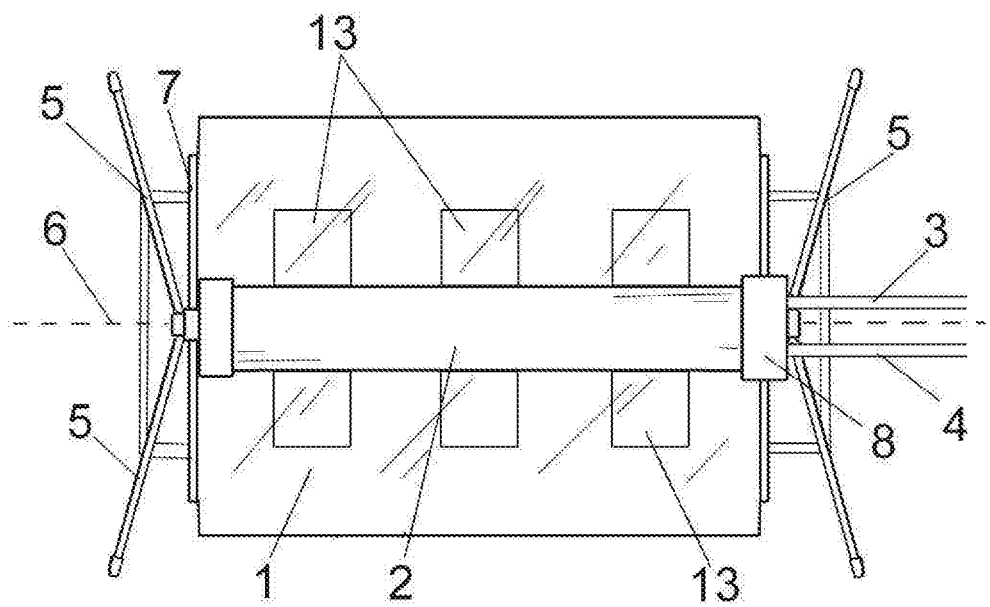
FIG. 1 shows a plan view of a parabolic concentrating solar collector made according to the object of the present invention.
Figure 2:
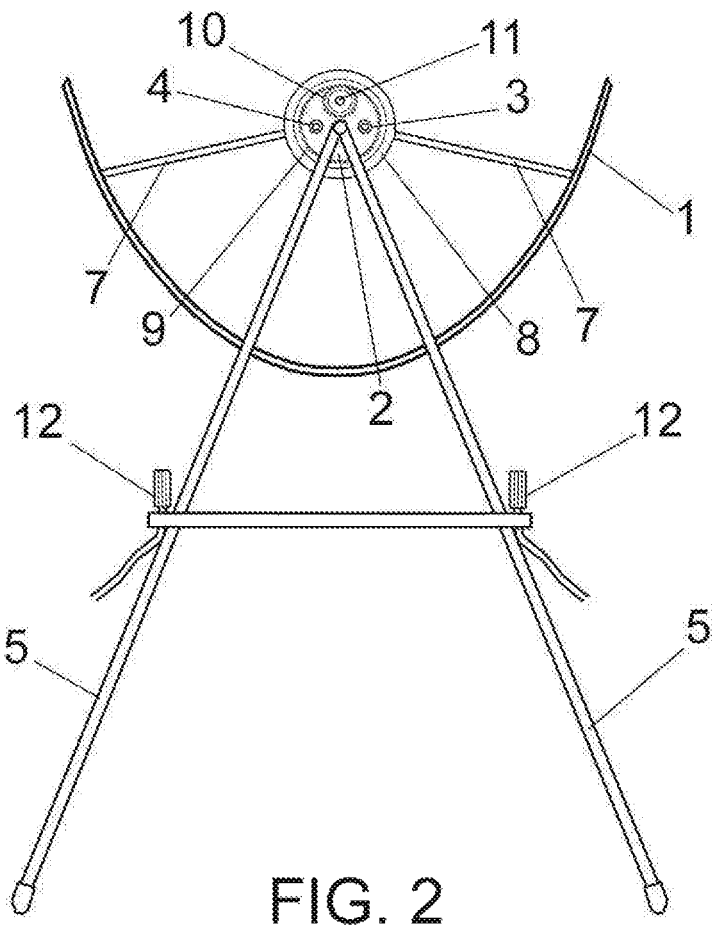
FIG. 2 shows a profile view of the device of the previous figure.

In view of the figures described, it can be seen how the parabolic concentrating solar collector of the invention is comprised of a parabolic reflective surface (1) and an element on which solar radiation is concentrated, in this case a tube vacuum tube (2), with its corresponding inlet (3) for water or fluid to be heated and outlet (4) for hot fluid, with the particularity that the vacuum tube (2) is statically arranged on a frame (5), in other words, integral with said frame, being linked to it at both ends.

For its part, and contrary to what occurs with the usual parabolic concentrating collectors, it has been envisaged that the parabolic reflective surface (1) pivots with respect to the imaginary central longitudinal axis (6) of the vacuum tube (2).

More specifically, said parabolic reflective surface (1) is linked through its lateral ends with arms (7) that converge in a bearing or bushing whose axis, as mentioned, is axial to the imaginary central longitudinal axis of the vacuum tube, so that in correspondence with the inlet and outlet (3-4) of the vacuum tube, it has been envisaged that said arms are integral with a ring (8), which is linked to the structure of the vacuum tube (2) through a bushing or bearing, a ring with which a toothed wheel (9) is integral, wheel with which a pinion (10) associated with a small electric motor (11) engages, integral with the structure associated with the vacuum tube (2) itself.

Figure 3:
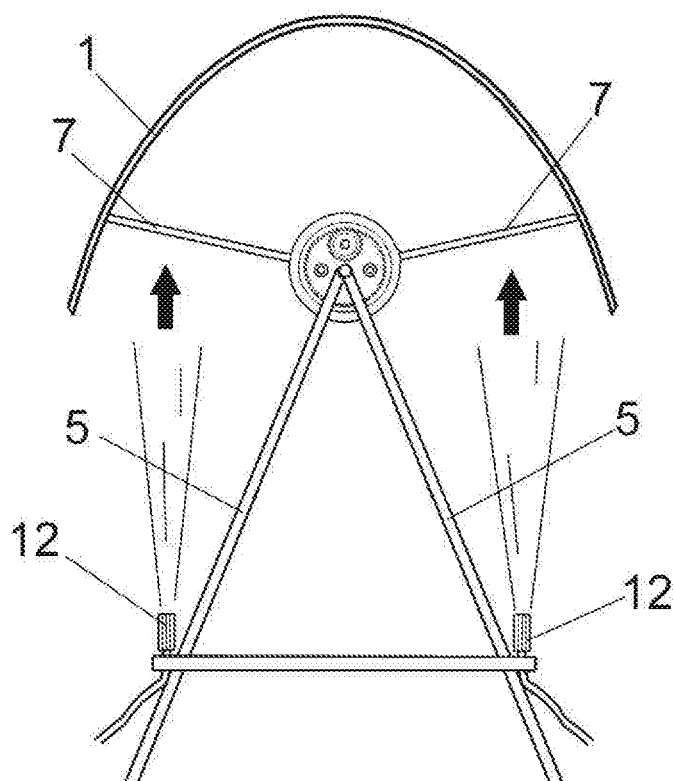
FIG. 3 shows a view similar to that of the previous figure, but in which the parabolic reflective surface has changed its inclination to its safety/inoperative position that coincides with the washing position, being able to observe how the vacuum tube is not affected by such movement.

This structure allows the parabolic reflective surface (1) to rotate 360° with respect to the vacuum tube without interfering with the pipes associated with the inlet (3) and the outlet (4), which allows said parabolic reflective surface (1) to rotate to the position shown in FIG. 3, or any other active safety position depending on the direction of the wind, which will be controlled by a microprocessor and the corresponding conventional control/sensor means, and can also be used to generate shade on the vacuum tube itself, when the temperatures reached therein may be excessive.

Figure 5:
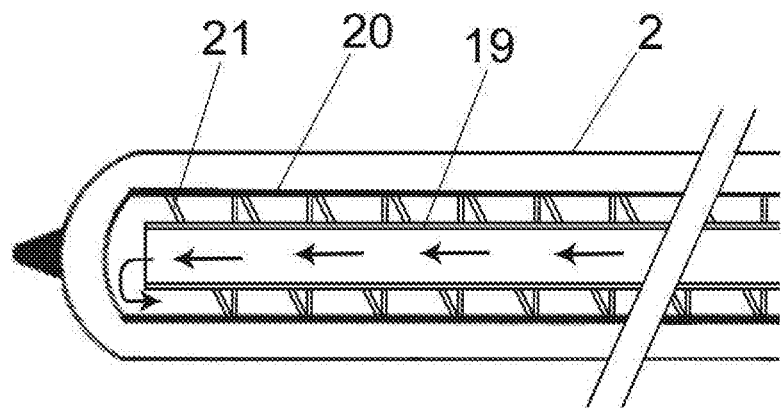
FIG. 5 shows a sectional detail of the new internal structure envisaged for the vacuum tube that participates in the device of the invention.

In order to maximise performance in heat transmission in the vacuum tube (2), it has been envisaged that it has a completely new structure, as shown in FIG. 5, so that the chamber through which the heat transfer fluid to be heated circulates is subdivided into two concentric cylindrical chambers, an internal chamber (19), through which the cold fluid is intended to flow, open at one of its ends through which it communicates with an external chamber (20), concentric to it, on which solar radiation is concentrated inside the vacuum tube, with the particularity that for a better distribution of the heat transfer fluid inside said chamber, it has been envisaged that there is a helical deflector (21) therein which forces the heat transfer fluid to rotate on the heat concentrating surface in its movement towards the outlet of said vacuum tube.

In this sense, and as mentioned previously, the section of the inlet to the internal chamber (19) must be the same as the outlet section of the external chamber (20) so that no pressure differences are created.

Returning again to FIG. 3, it has been envisaged that the frame (5) incorporates nozzles (12) that spray pressurised water, which allow the parabolic reflective surface (1) to be automatically washed, either periodically or in a programmed manner, or when it is calculated that its performance is not what it would correspond to based on the parameters obtained by the sensor means associated with the collector.

As mentioned previously, the collector will be able to auto-orient itself using any known auto-orientation system, based on the calculation of the angle of incidence of the sun, being assisted by one or more photovoltaic panels that ensure its complete autonomy.

Figure 6:
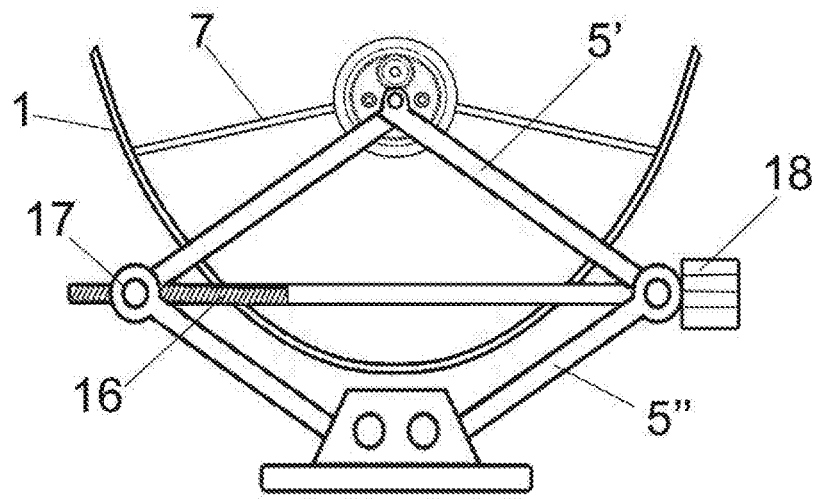
FIG. 6 shows a detail of one of the end support frames of the device.

Furthermore, the collector can also be inclined on one of its ends to control the azimuth. To do this, and as shown in FIG. 6, one of the end support frames of the device has a scissor-type structure (5'-5"), adjustable by means of a transverse worm screw (16), which threads into respective nuts (17) associated with the intermediate joints of the scissor structure, and which will be controlled by an electric motor (18) associated with the control electronics of the device.

Figure 4:
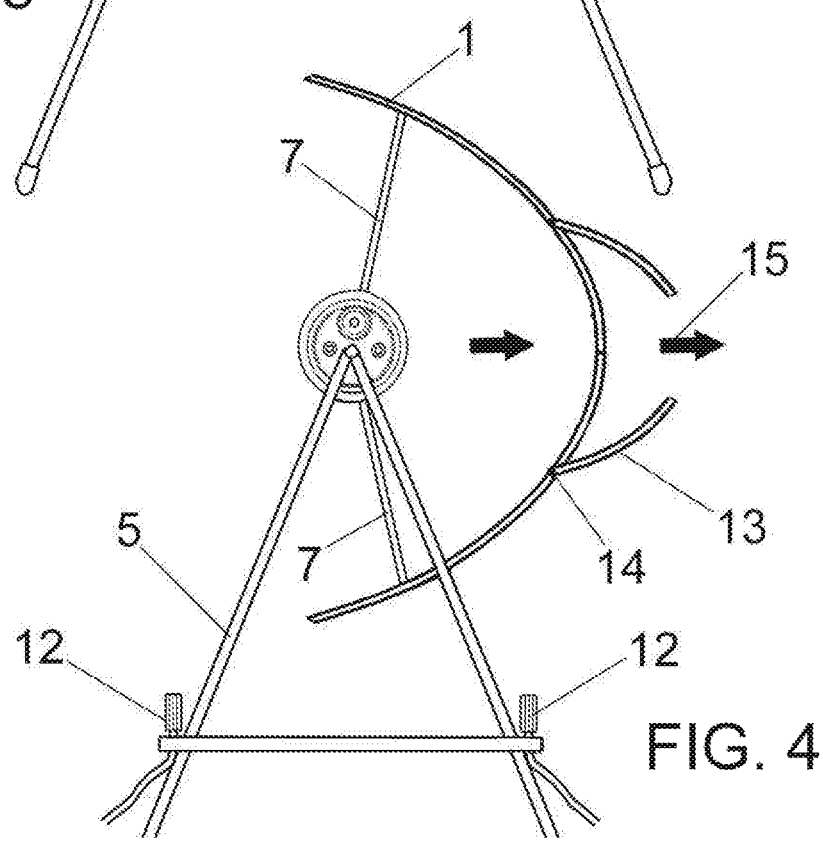
FIG. 4 shows a profile view of the device, in which it appears with its passive safety means in a working situation.

According to FIG. 4, it has been envisaged that the parabolic reflective surface (1) includes a series of sectors (13) in its central area which, also being reflective in nature, act as folding gates with respect to the axes (14) against the tension of a spring, thus determining passive safety means against strong gusts of wind (15).

Although it is not shown in the figures, a Fresnel-type concentrator lens can be arranged on the area of the vacuum tube (2) that is not affected by the parabolic reflective surface (1), lens which would be integral with the bearing structure of the parabolic reflective surface (1) in order to never interfere with it.

The invention claimed is:

1. A parabolic concentrating solar collector, includes a parabolic reflective surface associated with programmed and/or calculated solar tracking in real time, as well as an element on which solar radiation is concentrated, wherein the element is made of a vacuum tube, with a corresponding duly insulated inlet and outlet of fluid to be heated, wherein the vacuum tube is statically arranged on a frame, the parabolic reflective surface pivotable with respect to an imaginary central longitudinal axis of the vacuum tube, in which bushings or bearings through which the pipes associated with the inlet and outlet of the vacuum tube pass participate, unaffected by the pivotable movement of the parabolic reflective surface, wherein the chamber through which the fluid to be heated circulates in the vacuum tube is subdivided into two concentric chambers, an internal chamber, through which the cold fluid is fed, open at one ends through which the internal chamber communicates with an external chamber, concentrically positioned, on which solar radiation is concentrated inside the vacuum tube, wherein an inlet section to the internal chamber is an outlet section of the external chamber and wherein the parabolic reflection surface includes passive safety means against strong winds, made up of sectors, of a reflective nature, as folding gates with respect to axes against the tension of a spring, and wherein the parabolic reflective surface is linked to a structure of the vacuum tube through lateral ends by arms that converge in a bearing or bushing axial to the imaginary central longitudinal axis of the vacuum tube, wherein in correspondence with the inlet and outlet of the vacuum tube, the arms are integral with a ring, which is integral with a toothed wheel with which a pinion associated with a small electric motor engages, integral with the structure of the vacuum tube.

2. The parabolic concentrating solar collector, according to claim 1, wherein a helical deflector is arranged between the internal chamber and the external chamber of the vacuum tube.

3. The parabolic concentrating solar collector, according to claim 1, wherein the frame incorporates nozzles that spray pressurized water against the parabolic reflective surface.

4. The parabolic concentrating solar collector, according to claim 1, wherein a Fresnel-type concentrator lens is arranged on an area of the vacuum tube that is not affected by the parabolic reflective surface, the Fresnel-type concentrator lens integral with the bearing or bushing.

5. The parabolic concentrating solar collector, according to claim 1, wherein the vacuum tube and the parabolic reflective surface further comprise a horizontal arrangement with respect to their longitudinal axis.

6. The parabolic concentrating solar collector, according to claim 1, wherein the vacuum tube and the parabolic reflective surface further comprise a vertical arrangement with respect to their longitudinal axis.

7. The parabolic concentrating solar collector, according to claim 1, wherein the parabolic concentrating solar collector is installed with other solar collectors, all controlled through a single control device, whereby enabling and disabling solar collectors to adapt to changing requirements is achieved with the single control device.

8. The parabolic concentrating solar collector, according to claim 1, further comprising at least one photovoltaic panel for electrically powering the control device.

9. The parabolic concentrating solar collector, according to claim 1, wherein one of the end support frames of the device has a scissor-type structure, adjustable by a transverse worm screw, which threads into respective nuts associated with the intermediate joints of the scissor structure, and which is controlled by an electric motor linked to the control device.

* * * * *